United States Patent
Aurilio et al.

[15] 3,680,378
[45] Aug. 1, 1972

[54] FLUID FLOW RATE METER

[72] Inventors: Giuseppe Aurilio; Giovanni Aurilio, both of Medford; Valentine T. Faust, Jr., Manchester, all of N.H.

[73] Assignee: Fibre-Optics Industries, Inc., Milton, Mass. ; by said Giuseppe Aurilio and Giovanni Aurilio

[22] Filed: Sept. 11, 1970

[21] Appl. No.: 71,401

[52] U.S. Cl...............73/231 R, 73/230, 128/2.08
[51] Int. Cl..............................G01f 3/00
[58] Field of Search............73/194 M, 229, 230, 231

[56] References Cited
UNITED STATES PATENTS 3,613,451  10/1971  Scott.....................73/231

*Primary Examiner*—Richard C. Queisser
*Assistant Examiner*—Arthur E. Korkosz
*Attorney*—Kenway, Jenney & Hildreth This application filed under rule 47b

[57] ABSTRACT

A device for producing electrical pulses at a rate corresponding to the volume flow rate of air in a passage, with means to discriminate between directions of flow. A vane member is rotatably mounted in the passage and surrounded by a distensible diaphragm. The vaned turbine member has a transverse aperture through which light impulses travel from a light source to a photocell both mounted externally of the passage.

13 Claims, 8 Drawing Figures

INVENTORS
GIUSEPPE AURILIO
GIOVANNI AURILIO
VALENTINE T. FAUST, JR.
BY *Kenway, Jenney & Hildreth*

ATTORNEYS

PATENTED AUG 1 1972

INVENTORS
GIUSEPPE AURILIO
GIOVANNI AURILIO
VALENTINE T. FAUST, JR.

BY Kenway Jenney & Hildreth

ATTORNEYS

FLUID FLOW RATE METER

BACKGROUND OF THE INVENTION

The field of this invention generally comprises instruments for measuring the volume flow rates of gases. More particularly, it relates to devices for producing electrical output signals representative of the volume flow rate of air, as in a recording spirometer.

In the co-pending United States application of Jack R. Lambert, Ser. No. 738,517, filed June 20, 1968, now U.S. Pat. No. 3,555,555 dated Jan. 12, 1971, there is a description of a portable recording spirometer having a mouthpiece with an air passage into which the patient breathes, exhaling and inhaling to produce a permanent two-dimensional photographic record on which the volume of air movement is plotted as the ordinate against time as the abscissa. The record provides a measure of breathing ability in terms of tidal volume, forced vital capacity, forced expiratory volume and maximum expiratory flow rate, and allows a determination of the estimated maximum breathing capacity. In the instrument there described the air passage is curved to invert the air flow and contains a vaned impeller which is secured to a threaded axially orientated shaft in fixed bearings. Moving air turns the impeller which rotates the shaft. A movable carriage is engageable with the threads on the shaft and moves in one direction longitudinally of the shaft during the patient's exhalation and in the opposite direction during inhalation. The position of the carriage on the shaft corresponds to the ordinate of the recorded function or curve, and the abscissa is obtained by the use of a constant speed motor contained within the instrument. This instrument relies upon the production of a mechanical displacement of the carriage by the impeller to produce the recorded function.

It is an object of this invention, stated generally, to make improvements in the mouthpiece and functionally related elements of a recording spirometer, with a particular view to operating characteristics of the type desired in such instruments. An important characteristic desired in a spirometer relates to its useful range as measured by the volume rate of air flow through the mouthpiece. For most practical purposes this range extends from about 100 cc/sec. to about 10,000 cc/sec., that is, from about 0.1 liter/sec. to about 10 liters/sec. Since a mouthpiece of practical design is limited in diameter by the fact that the patient must place his lips directly over one end, this diameter may be typically in the vicinity of two centimeters, and at the high end of the operating range the air velocity would therefore reach nearly 32 meters per second.

Coupled with the foregoing is the added requirement that the mouthpiece should offer only very small or negligible back pressure at any volume flow rate within this range. For example, is some instruments it is desired to limit the back pressure to not more than 3 cm. of water. This requirement arises from the fact that a spirometer is ideally intended to measure a patient's ability in breathing against atmospheric pressure. It will be evident that the difficulty of avoiding a buildup of back pressure is greatest at high flow rates.

It has been found that one of the difficulties of accomodating high flow rates in a spirometer mouthpiece with negligible back pressure is that of attaining the desired degree of sensitivity, particularly at the low end of the working range. It is an object of this invention to attain the desired sensitivity, and at the same time to provide an instrument that closely maintains its adherence to calibration at all flow rates within the operating range.

A further object of this invention is to achieve the foregoing characteristics with a mouthpiece adapted to be maintained and used conveniently and under hygienic conditions, thereby to avoid cross-contamination of patients. This requirement necessitates using either a separately sterilizable mouthpiece or a disposable mouthpiece. In the latter case, which may be the most practical for a portable unit suitable for house visits and field use, it is desirable to provide a simple construction that can be manufactured at relatively low cost, but with no appreciable variation in operating characteristics and calibration between the individual disposable mouthpieces.

SUMMARY OF THE INVENTION

This invention provides substantial improvements over the mouthpiece described in the above-mentioned co-pending application, and it also meets the above-described operating requirements by providing a separate, hand-held mouthpiece assembly that produces electrical pulses at a rate corresponding to the volume flow rate of air in a straight-through flow passage. Within this passage a vaned turbine member is rotatably mounted, this member having a transverse aperture through which light impulses are gated to a photocell that produces the electrical impulses. Both the source of light and the photocell are mounted externally of the passage and offer no obstruction to the flow of air.

Surrounding the vaned member is a distensible annular diaphragm that lies in a plane generally transverse to the flow passage. This diaphragm tends to deflect the air radially inwardly so that it impinges upon the vanes, fins or blades of the vaned member, especially at the lowest flow rates. The diaphragm is increasingly distended at increasingly higher flow rates, thereby allowing an increasing fraction of the total flowing air to bypass the vanes. The change of air pressure incident to the distention of the diaphragm is very small and does not exceed the prescribed back pressure limit.

As a result of the foregoing construction, the vaned member of the invention has an angular velocity that increases with increasing volume flow rates at all points within the operating range.

DESCRIPTION OF THE PREFERRED EMBODIMENT

Figure 8:
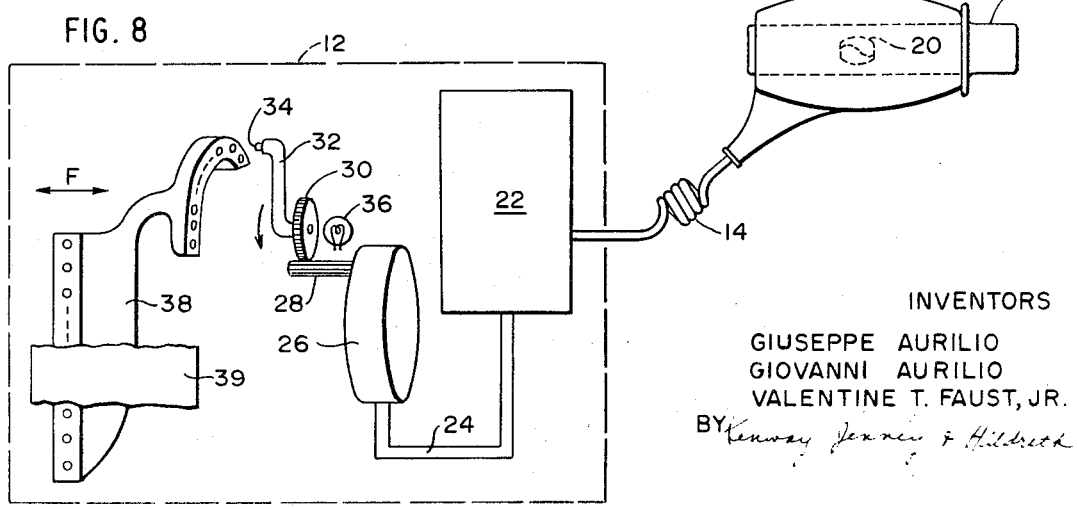
FIG. 8 is a schematic diagram showing the mouthpiece assembly connected to the recording parts of the instrument.

Reference is made to FIG. 8 and the above-identified copending application for a detailed description of parts of the recorder portion of the spirometer. This recorder may be constructed as described in said application except for the means employed for determining the ordinate position of the curve on the photographic record. In general, the mouthpiece assembly hereinafter described produces electrical pulses at a rate proportional to the angular rate of rotation of the vane member. These pulses cause the advancement of a member bearing an illuminated optical fiber in relation to the fixed end of an array of optical fibers described in said application, having their opposite ends movable in the direction of the abscissa on the sheet of photographic paper.

The general arrangement of the parts is shown in FIG. 8. The recording portion of the spirometer is schematically shown enclosed by broken lines at 12. It is connected by a coiled flexible cable 14 to to a hand-held mouthpiece holder 16 into which a disposable mouthpiece 18 is inserted. Preferably, the instrument 12 is a small portable unit as described in said application, and includes a film pack holder for the photographic recording sheets. These sheets are preferably of the self-developing type commonly known as Polaroid film.

The patient's mouth is placed over the right end of the mouthpiece 18 as viewed in FIG. 8, and he blows through it to rotate a vaned member 20 contained within it. The member 20 comprises a turbine that rotates in one direction for exhalation and in the opposite direction for inhalation. By the use of photoelectric means hereinafter more fully described in relation to the other drawings, the vaned member produces electrical impulses that are transmitted through the cable 14 to an electronic circuit 22 housed within the recorder. The circuit 22 has multiple functions with which the present invention is not directly concerned. It includes, for example, a power source preferably in the form of one or more batteries or a power converter for connection to a wall outlet, means for controlling the driving and mechanical resetting of the movable parts within the recorder 12, means for detecting the direction of air flow and means to count the electrical impulses.

The circuit 22 is connected by a cable 24 to a stepping motor 26 and delivers amplified electrical impulses, derived from the pulses transmitted through the cable 14, to the stepping motor to advance its output pinion 28 a predetermined discrete angle for each impulse, thereby turning a gear 30. The gear 30 rotates an arm 32 containing a single optical fiber 34 illuminated at one end by a bulb 36. The fiber 34 is thus moved angularly about a fixed arcuate configuration of optical fiber ends, the fibers comprising an array shown generally at 38. The opposite or output end of the array 38 is movable and is preferably arranged with the fiber ends in a straight line in optical recording relation to the photographic film, shown at 39. This line extends in the direction of the ordinate on the photographic record. By means of a constant speed drive motor (not shown), the latter end of the array is movable in either direction indicated by the arrows F extending in the direction of the abscissa. The means for moving the output end of the optical fiber array 38 are fully described in said co-pending application.

The arm 32 is rotated to a position in predetermined relation to one end of the arcuate array prior to the initiation of a recording, rotates in one direction in response to advancement of the stepping motor 26 during the patient's exhalation, and rotates in the reverse direction toward the starting point during the patient's ensuing inhalation. This produces the optical image of a line in the general form of a curve of oscillation upon the recording film, and when observed behind a suitably dimensioned graticule the dimensions of the curve provide measures of the patient's breathing ability as previously stated.

We turn next to a more complete description of the mouthpiece assembly, having reference to FIGS. 1 to 7. The holder 16 is a rounded, hollow, molded plastic body shaped to fit within the patient's hand by closing his fingers around it while placing his lips over the outwardly extending portion of the mouthpiece 18. The inner ends of the holder are sleeve-shaped to receive the mouthpiece 18, and one end has a longitudinal locating keyway 40 (FIG. 1) to cooperate with a key 42 extending from the mouthpiece 18. The keyway and key accurately locate the mouthpiece angularly with respect to the holder. An annular flange 43 on the mouth piece abuts an end of the holder and accurately locates the mouth piece longitudinally with respect to the holder.

An annular sheet 44 of insulating material (FIG. 6) with a circular central hole is received in a groove 46 formed in the inner wall of the holder 16. Preferably, this sheet is a printed circuit board supporting electronic components (not shown) associated with the photoelectric elements hereinafter described.

Figure 6:
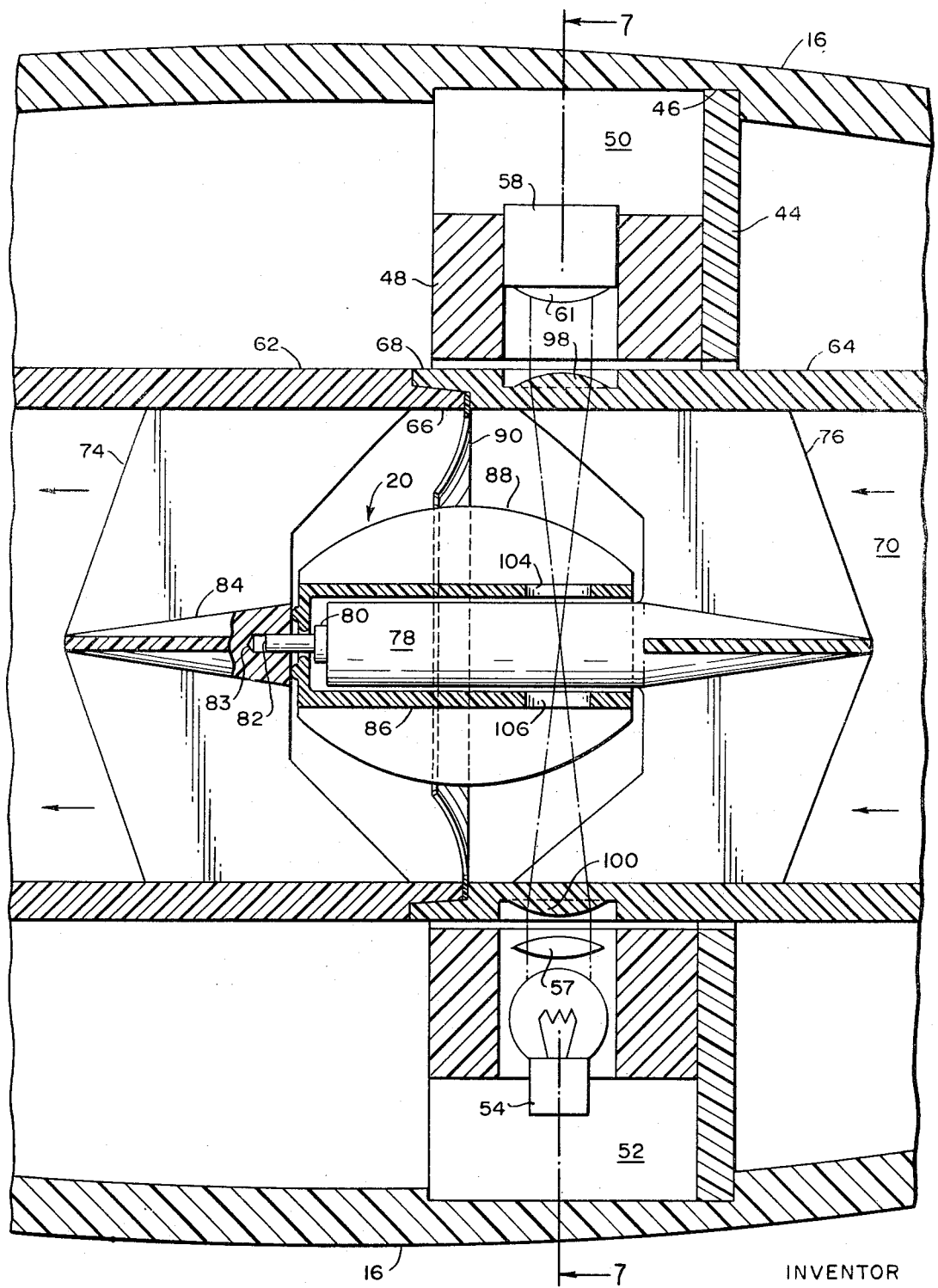
FIG. 6 is an enlarged partial side elevation in section showing the mouthpiece with the vaned member and diaphragm assembled in the holder.
Figure 7:
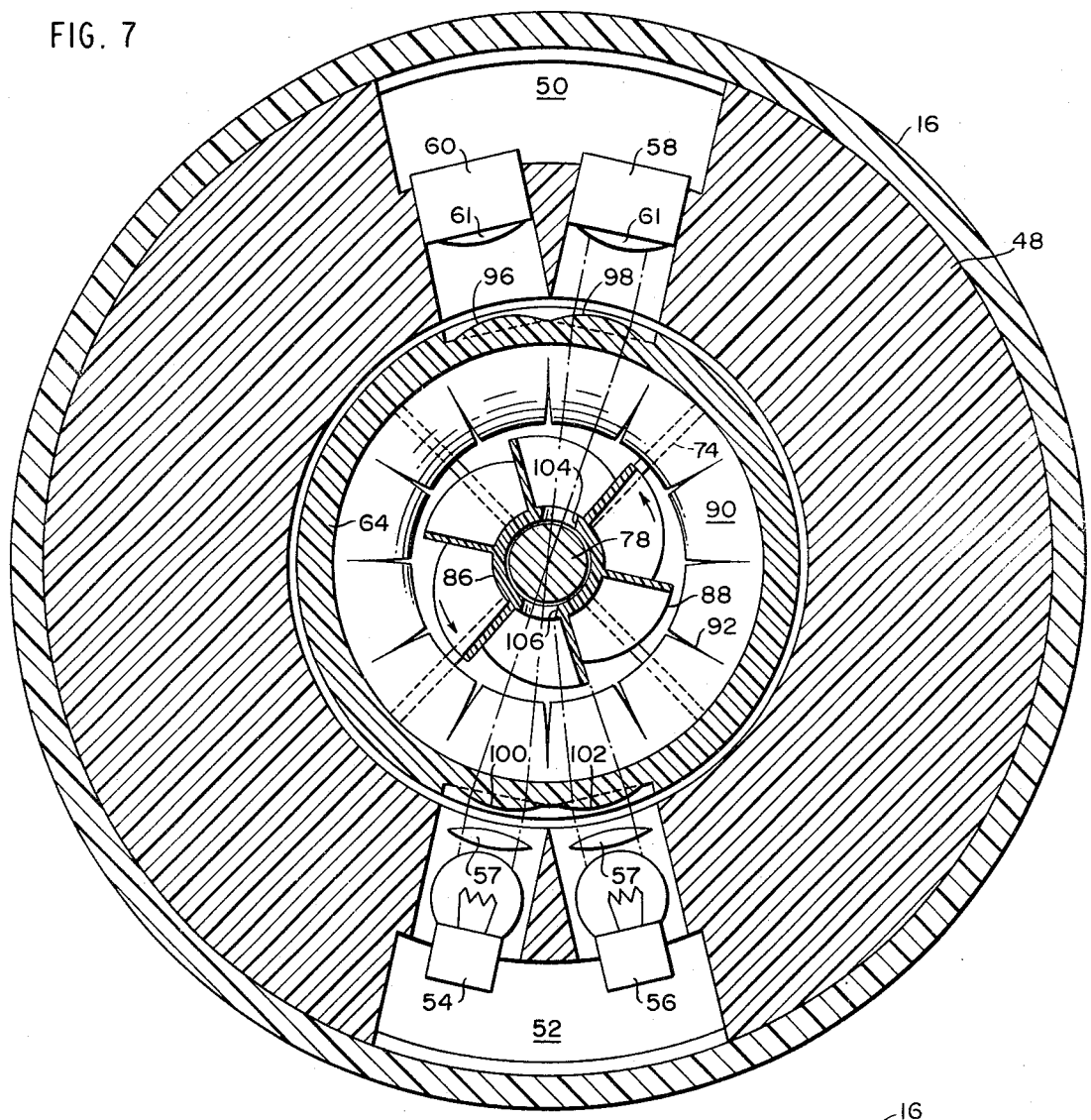
FIG. 7 is an end elevation in section taken on line 7—7 in FIG. 6.

A signal ring 48 is secured adjacent the sheet 44, also within the annular groove 46. The ring 48 has inner and outer cylindrical surfaces of the same diameter as those on the sheet 44, with two diametrically opposite cut-outs defining spaces 50 and 52 (FIGS. 6 and 7). Each of these cut-outs communicates with the inner surface by a pair of radial bores, preferably angularly displaced by 30° with respect to one another. Within two of these bores are located light sources 54 and 56, the sources having light collimating lenses 57. In the opposite bores are located corresponding photocells 58 and 60, respectively, the photocells having lenses 61 adapted to focus collimated light thereon. The photocell 58 is diametrically opposite the light source 54, and the photocell 60 is diametrically opposite the light source 56. The light sources and photocells are connected by wiring, not shown, to the circuit elements mounted on the sheet 44. The cable 14 is also connected to these circuit elements.

The above-described elements comprise the permanent portions of the mouthpiece assembly which includes all of the printed circuits and the associated parts of the signal ring assembly. Turning next to the disposable mouthpiece 18, this comprises the unit shown in FIG. 2 which is inserted in the holder and located by the key 42 and keyway 40 to define accurately the angular position of the mouthpiece in relation to the components mounted on the signal ring 48. The outer portion of the mouthpiece 18 consists of two generally cylindrical clear molded plastic sleeves 62 and 64 fitted together by means of mating end flanges 66 and 68, respectively, thus forming a continuous smooth-walled cylindrical air passage or duct 70. The sleeve 64 has the outer radially-extending annular flange 43 that abuts the end of the holder 16, thereby accurately defining the longitudinal position of the mouthpiece in relation to the holder. A pair of finned, clear transparent plastic guides 74 and 76, each having four fins spaced 90° apart, are either molded integrally with the sleeves or received in the ends of the sleeves 62 and 64, respectively. These guides are accurately spaced with respect to one another when the sleeves are fitted together, as shown in FIG. 6. The guide 76 has an axially extending integral cylindrical hub portion 78, a first reduced axial integral cylindrical extension 80 and a second further reduced axial integral cylindrical extension 82, the latter being received in an axial hole 83 in a hub portion 84 on the guide 74.

The vaned turbine member 20 is molded of a light weight, opaque plastic and is freely received over the hub 78. The vaned member has a hollow cylindrical sleeve portion 86 and a plurality of thin, integral, equally-spaced vanes 88 of curved peripheral outline, each vane having a progressively greater depth from the ends toward the center and being joined to the sleeve portion along a helical curve as shown most clearly in FIG. 5. When fully assembled in position between the guides 74 and 76, the vaned member 20 is freely rotatable in either direction with very little friction in response to the passage of air through the duct or passage 70.

Figure 4:
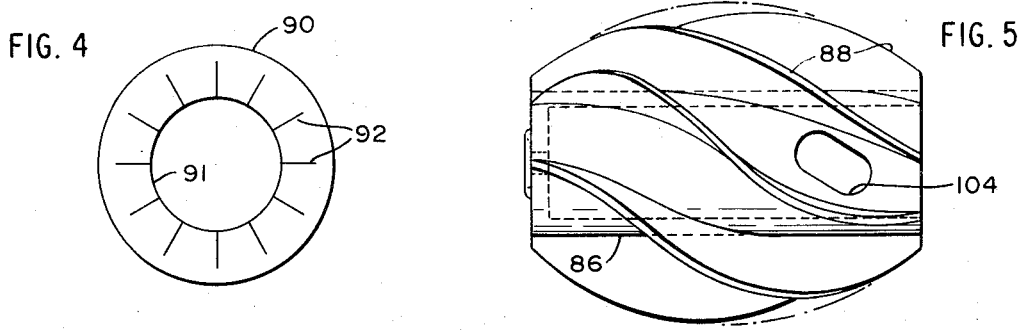
FIG. 4 is a detail view of the distensible diaphragm.
Figure 5:
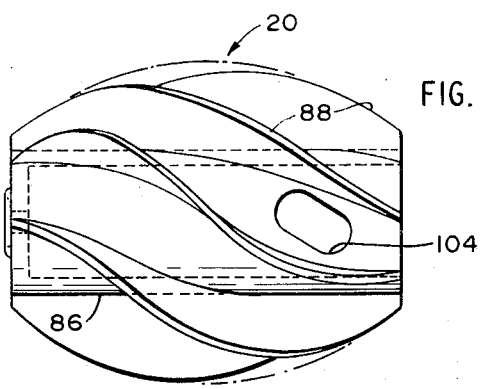
FIG. 5 is a detail view of the vaned member.

Between the abutting end surfaces of the sleeves 62 and 64 as shown in FIG. 6 there is fastened a thin, annular, flexible plastic sheet comprising a diaphragm 90 having a circular central hole 91 (FIG. 4). This sheet is preferably made of polyethylene, Mylar (a polyethylene teraphthalate resin film sold by duPont), or some other equivalent material substantially unaffected by humidity. This diaphragm has a number of equally-spaced radial slits 92 that render the diaphragm distensible in response to air flowing through the passage 70. The slits are completely through the thickness of the sheet but terminate short of its outer periphery as illustrated. The diaphragm extends radially an appreciable portion of the distance between the inner wall of the passage 70 defined by the sleeves 62 and 64 and the sleeve portion 86. Also, it is located at the longitudinal position of greatest radial extension of the vanes 88. The diameter of the hole 91 in the diaphragm is slightly greater than the maximum diameter of the vaned member so that it does not touch the latter, although it is preferable to have only a small clearance between these parts.

The sleeve 64 has integrally molded clear plastic lens portions 96, 98, 100 and 102 (FIGS. 2, 6 and 7) accurately formed in recesses in its outer surface. These lens portions are located with their optical axes on radial lines extending through the axis of the air passage 70 which is also the axis of rotation of the vaned member 20. When the mouthpiece is accurately located within the holder 16 as described above, these same radial lines also pass through the optical axes of the lenses 61 and 57 associated with the photocells 60 and 58 and the light sources 54 and 56 as shown in FIG. 7. The focal lengths of these lens portions are identical and equal the radius of the air passage 70; that is, they are arranged to receive collimated light from the lenses 57 and to cause the images of the filaments of the light sources 54 and 56 to be focused in the axis of rotation of the vaned member at the center of the hub 78. Also, the lens portions 96 and 98 are operative in combination with the lenses 61 to refocus these images upon the photocells 58 and 60. It will be understood that this can also be accomplished by using the lens portions 96, 98, 100 and 102 alone with suitable focus correction, thus eliminating the lenses 57 and 61, or using other alternative techniques in accordance with well-known optical practice.

The sleeve portion 86 of the opaque vaned member has a pair of diametrically opposite holes 104 and 106 (FIGS. 6 and 7) aligned with the light sources and photocells for selectively gating the light paths between these elements to generate electrical signal pulses. As shown in FIG. 7, the photocells are energized in sequence, the sequence 60, 58 representing clockwise rotation and the sequence 58, 60 representing counter-clockwise rotation. Logic circuits for discriminating between these directions are included in the unit 22 as described above, and are constructed in accordance with generally available knowledge in the computer art. Impulses from the photocell 58 and the photocell 60 are transmitted by means of the cable 14 to the electronic unit 22 in the recorder 12 (FIG. 8), and used for operating the stepping motor 26 as previously described.

Figure 1:
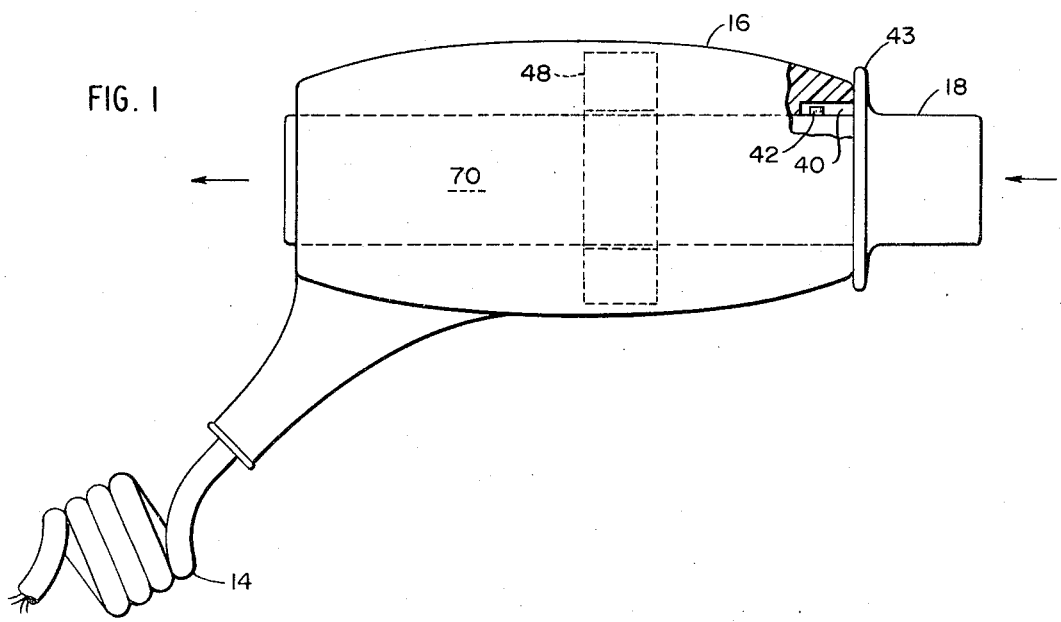
FIG. 1 is a side elevation partially in section showing a preferred form of mouthpiece assembly for a recording spirometer according to this invention.
Figure 2:
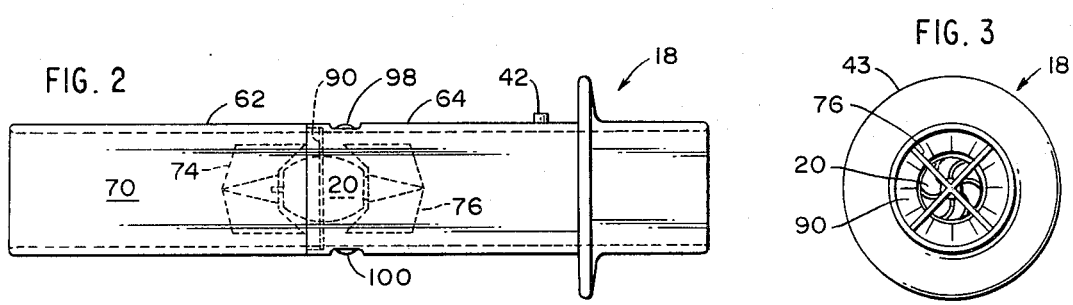
FIG. 2 is a side elevation of an assembled disposable mouthpiece which in FIG. 1 is shown inserted in its holder.
Figure 3:
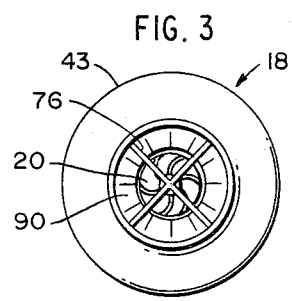
FIG. 3 is an end view of the mouthpiece viewed from the right end in FIG. 2.

In operation, the patient exhales air into the passage 70 in the direction indicated by the arrows in FIGS. 1 and 6. If the air is moving at only a low volume rate, the diaphragm 90 is distended relatively little and confines the air so that nearly all of it passes between the vanes 88, causing the vaned member to rotate with a sensitive response to the flow of air. In view of the symmetry in the construction, the same applies to inhalation of air at the same rate, with reversed rotation of the vaned member 20. For low rates of flow the angular velocity of the vaned member 20 is relatively low, and the pulse rate produced by the photocells is also correspondingly low. Thus the stepping motor 26 advances the arm 32 at a relatively low rate in relation to the fixed arcuate end of the fiber optical bundle 38.

If the air is moving through the passage 70 at a higher rate, it causes distention of the diaphragm 90 as shown in FIGS. 6 and 7 as a result of the flexibility imparted by the slits 92. This allows a portion of the air to bypass the vaned member 20 while allowing sufficient air to impinge on the vanes 88 to impart an increased angular velocity to the vaned member. By this means it is possible to provide for substantial air velocities. These cause substantial deflection of the diaphragm 90 and create little back pressure, the latter being insufficient to be noticeable to the patient as compared with inhaling or exhaling directly to the atmosphere.

The effect of the diaphragm 90 on the air flow through the passage 70 is a function of the air velocity and the diaphragm offers a greater restriction to the flow of air at lower velocities. This is accomplished by setting up an annular barrier of air turbulence on the upstream side of the diaphragm, which tends to deflect the air inwardly toward the central portion of the air passage 70, thereby tending to force a greater volume of the flowing air to impinge on the vanes 88 of the vaned member. At greater air velocities this annular barrier takes on a changed configuration, partly resulting from the greater air velocity and partly resulting from the more distended shape of the diaphragm 90. It will be understood that the diaphragm is fabricated of a very flexible material that readily and resiliently yields to the flow of air, while at the same time offering sufficient resistance to set up the necessary turbulence. As a result, the diaphragm offers a resistance to the flow of air of such small magnitude at any given flow rate within the operating range that the back pressure generated by it is insufficient to influence the breathing of the patient.

By means of the foregoing improvements upon the recording spirometer described in said co-pending application, the instrument has been rendered more useful, more reliable and more convenient to operate. The recording instrument 12 may be placed conveniently upon a table near the patient, and it is only necessary to grasp the mouthpiece handle 16 and have the patient blow into the mouthpiece 18 while situated in any convenient or desired position such as lying, sitting, standing, or moving in place. Thus the instrument may be used for obtaining accurate measurements on either patients who are extremely feeble and have small breathing ability or healthy, robust persons. The disposable mouthpiece 18 is of simple construction and may be produced at low cost. Since this portion of the instrument is the only portion exposed to the patient's breath, cross-contamination of patients is effectively prevented.

It will be understood that various modifications can be made in the illustrated embodiment pursuant to practical considerations in manufacture or use, using generally available technology and without departing from the spirit or scope of this invention.

We claim

1. A fluid flow rate meter having, in combination,
   a fluid conveyor having a tubular passage and axial bearing means therein,
   a vaned turbine member rotatably supported by the bearing means, having vanes projecting radially toward the inner wall of the passage, and rotatable by the flow of fluid through the passage,
   a flexible diaphragm secured to said inner wall, projecting toward the vanes and having provision to deflect downstream therefrom in response to fluid flowing in the passage, and,
   a generator responsive to the rotation of said turbine member to produce electrical pulses at a rate corresponding to the volumetric flow rate of fluid in the conveyor.

2. The combination according to claim 1, in which the passage is substantially straight and obstructed only by the diaphragm, the bearing means and the turbine member.

3. The combination according to claim 1, in which the axial bearing means comprise,
   fins supported by the fluid conveyor and extending radially of the passage, and,
   bearings supported on the fins.

4. The combination according to claim 1, in which the vanes have a generally helical shape.

5. The combination according to claim 1, in which a substantial portion of the cross section of the passage is outside the radial periphery of the turbine member, said diaphragm substantially closing said portion when in the undeflected condition.

6. The combination according to claim 5, in which the diaphragm has a central aperture wherein the turbine member is located, said aperture being distensible in response to fluid pressure.

7. The combination according to claim 5, in which the diaphragm is a substantially flat sheet extending transversely of the passage, having a circular central hole therein and a plurality of generally axial slits extending from said hole a portion of the distance toward said inner wall.

8. The combination according to claim 7, in which the sheet is a plastic having a flexibility substantially unaffected by humidity.

9. The combination according to claim 1, in which the generator includes,
   means to project light upon the turbine member,
   a photocell adapted to receive light from the turbine member, and,
   a pulse generator operable by the photocell to produce electrical pulses.

10. The combination according to claim 9, in which the means to project light, the photocell and the pulse generator are external to said passage.

11. The combination according to claim 10, in which the fluid conveyor has a translucent wall portion through which light is projected to and from the turbine member.

12. The combination according to claim 11, in which said translucent wall portion has integral lens portions for receiving said light.

13. The combination according to claim 9, including means to project plural light beams angularly displaced about the axis of rotation of the turbine member, a photocell and pulse generator for each beam, and logic means adapted to discriminate between the senses of rotation of said turbine member.

* * * * *

PO-1050
(5/69)

UNITED STATES PATENT OFFICE
CERTIFICATE OF CORRECTION

Patent No. 3,680,378  Dated August 1, 1972

Inventor(s) Giuseppe Aurilio, Giovanni Aurilio & Valentine T. Faust, Jr.

It is certified that error appears in the above-identified patent and that said Letters Patent are hereby corrected as shown below:

In the Abstract, line 4, cancel "vane" and substitute --vaned turbine--; line 6, cancel "turbine"

Signed and sealed this 1st day of May 1973.

(SEAL)
Attest:

EDWARD M. FLETCHER, JR.
Attesting Officer

ROBERT GOTTSCHALK
Commissioner of Patents